(12) United States Patent
Kwon et al.

(10) Patent No.: US 6,566,902 B2
(45) Date of Patent: May 20, 2003

(54) LIQUID CRYSTAL DISPLAY DEVICE FOR TESTING SIGNAL LINE

(75) Inventors: Keuk Sang Kwon, Kyoungsangbuk-do (KR); Yong Ik Bang, Daegu-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 153 days.

(21) Appl. No.: 09/893,993

(22) Filed: Jun. 29, 2001

(65) Prior Publication Data
US 2002/0075419 A1 Jun. 20, 2002

(30) Foreign Application Priority Data
Dec. 20, 2000 (KR) .................................... 2000-79373

(51) Int. Cl.⁷ ............................................... G01R 31/00
(52) U.S. Cl. ........................................ 324/770; 349/40
(58) Field of Search ..................... 349/40, 54, 192; 324/770

(56) References Cited

U.S. PATENT DOCUMENTS 5,057,775 A * 10/1991 Hall .......................... 324/770
6,175,394 B1 * 1/2001 Wu et al. .................... 349/40

\* cited by examiner

*Primary Examiner*—Jey Tsai
(74) *Attorney, Agent, or Firm*—Morgan, Lewis & Bockius LLP

(57) ABSTRACT

A liquid crystal display device structure is provided for testing display signal lines. The display structure improves sensitivity in detecting shorts or opens in data signal lines. In the display, a first detecting line commonly connects odd-numbered data signal lines of a liquid crystal display panel, and a second detecting line commonly connects even-numbered data signal lines of the liquid crystal display panel. First and second electrostatic discharge (ESD) preventing circuits are respectively connected to the odd and even-numbered data signal lines. A first electrode line commonly connects the first ESD preventing circuits and a second electrode line commonly connects the second ESD preventing circuits. Resistances are connected in series between the common electrode lines to increase a detectable critical resistance between the two detecting lines, to thereby improve sensitivity in signal line fault detection.

6 Claims, 4 Drawing Sheets

LIQUID CRYSTAL DISPLAY DEVICE FOR TESTING SIGNAL LINE

This application claims the benefit of Korean Patent Application No. P2000-79373, filed on Dec. 20, 2000, which is hereby incorporated by reference.

BACKGROUND OF THE INVENTION

1. Field of the Invention

This invention relates to a liquid crystal display, and more particularly, to a testing structure in liquid crystal display.

2. Description of the Related Art

Generally, a liquid crystal display (LCD) controls a light transmissivity of liquid crystal using an electric field to display a picture. The LCD typically includes a liquid crystal panel having liquid crystal cells arranged in a matrix configuration and a driving circuit for driving the liquid crystal panel. The liquid crystal panel also is provided with a plurality of pixel electrodes and a common electrode for selectively applying an electric field to each liquid crystal cell. The pixel electrodes typically are provided on a lower substrate for each liquid crystal cell, whereas the common electrode is integrally formed on the entire surface of an upper substrate. Each of the pixel electrodes is connected, via a source, an active region and a drain of a thin film transistor (TFT) used as a switching device, to one of a plurality of data signal lines. A gate terminal of each TFT positioned along a row of pixel cells is connected to one of a plurality of gate lines for applying pixel voltage signals from the data signal lines to pixel electrodes along the row.

After the LCD device having the above-described configuration is completed, a test process is performed to detect shorts and breakage of the signal lines, i.e., fault detection is carried out for the gate signal lines, the data signal lines, and the TFTs of the display panel.

To this end, the LCD device includes a structure for detecting a faulty line among the data signal lines and the gate signal lines. In particular, a testing pad is provided on the LCD device, and the data signal lines are divided into odd-numbered ones and even-numbered ones to test for faults in their structure.

FIG. 1 shows a related art LCD device structure for detecting a signal line fault. The LCD device includes a picture display portion 10 having liquid crystal cells arranged in a matrix configuration, gate pads 6 connected to gate lines GL, and data pads 2 connected to data signal lines DL. An odd-numbered detecting line ODDL is commonly connected via the data pads 2 to the odd-numbered data signal lines DL, an even-numbered detecting line EDDL is commonly connected via the data pads 2 to the even-numbered data signal lines DL, and electrostatic discharge (ESD) preventing circuits 4 are connected between a common electrode line CL and the data signal lines DL.

The picture display portion 10 includes the gate signal lines GL, the data signal lines DL, thin film transistors (TFT's) formed at each intersection between the gate lines GL and the data signal lines DL, and liquid crystal capacitors Clc connected to the TFT's. The liquid crystal capacitor Clc equivalently represents a liquid crystal cell including a common electrode and a pixel electrode provided at the TFT array panel that are opposed to each other with a liquid crystal therebetween. The liquid crystal capacitor Clc charges a data voltage input via the data signal line DL to drive a liquid crystal, thereby controlling a light transmissivity of the liquid crystal.

The ESD preventing circuit 4 is connected between the common electrode line CL and each data signal line DL, and is supplied with a common voltage Vcom. The ESD circuits typically consist of a plurality of thin film transistors and exhibit a low impedance at a high voltage to discharge an over-current during an ESD event. On the other hand, the ESD preventing circuit 4 has a high impedance under normal driving conditions so that driving signals applied via the data signal line are not affected.

The odd-numbered detecting line ODDL commonly connected to the odd-numbered data signal lines DL and the even-numbered detecting line EDDL commonly connected to the even-numbered data signal lines DL are used to test for faults in the data signal lines DL. More specifically, a specific signal pattern is applied to the odd-numbered detecting line ODDL and the even-numbered detecting line EDDL via a testing pad (not shown). A resistance difference between the odd-numbered detecting line ODDL and the even-numbered detecting line EDDL is measured to detect the presence of line faults, such as shorts, breakage, opens, and other defects in the data signal lines DL.

However, in the related art LCD device, since the data signal lines DL are connected in parallel between the odd-numbered detecting line ODDL and the even-numbered detecting line EDDL, an overall measured line resistance is decreased. A decrease in overall measured line resistance causes a decrease in a critical resistance value that is used for detecting line faults, and results in difficult and often unreliable detection of faults.

More specifically, as shown in FIG. 1, both the odd-numbered data signal lines DL commonly connected to the odd-numbered detecting line ODDL and the even-numbered data signal lines DL commonly connected to the even-numbered detecting line EDDL are connected to a single common electrode line CL by way of the ESD preventing circuits 4. Thus, from the perspective of the common line CL and the ODDL and EDDL lines, the group of odd-numbered signal data lines and the group of even-numbered data signal lines form two groups of line resistances connected in parallel.

FIG. 2 schematically illustrates an equivalent circuit illustrating the above-described groups of parallel resistances. In particular, FIG. 2 shows the odd-numbered data signal lines DL having line resistance components Rodd1 to RoddN connected in parallel between the odd-numbered detecting lines ODDL and the common electrode line CL. Similarly, the even-numbered data signal lines DL have line resistance components Reven1 to RevenN connected in parallel between the even-numbered detecting lines EDDL and the common electrode line CL. Since all the data signal lines DL are connected in parallel to a single common electrode line CL via the ESD circuits 4, an appreciable line resistance difference between the odd-numbered detecting line ODDL and the even-numbered detecting line EDDL is difficult to obtain, and results in a low level detection critical resistance. If the detection critical resistance is low, it becomes extremely difficult to detect shorts or other faults in the data signal lines DL beyond the detection critical resistance.

Moreover, the increased number of data signal lines required for high-resolution pictures in an LCD device further decreases a measured line resistance difference because a greater number of signal lines are connected in parallel. Accordingly, the detection critical resistance is caused to farther decrease between the odd-numbered detecting line ODDL and the even-numbered detecting line EDDL. As a result, it becomes nearly impossible to detect signal line shorts and other related defects beyond the detection critical resistance.

Thus, there remains a need in the art for an LCD device structure that allows quick and accurate assessment of signal line integrity in an uncomplicated and cost effective manner.

SUMMARY OF THE INVENTION

Accordingly, the present invention is directed to a liquid crystal display structure for testing signal lines that substantially obviates one or more of the problems due to limitations and disadvantages of the related art.

One aspect of the present invention is a liquid crystal display device structure for testing a signal line in which an ability to detect a fault in a data signal line is improved by providing additional resistance to a signal line testing circuit.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages in accordance with the present invention, as embodied and broadly described, the liquid crystal display structure for testing a signal line includes a first plurality of signal lines and a second plurality of signal lines. The signal lines of the second plurality of signal lines are alternately arranged with signal lines of the first plurality of signal lines on the display panel. A first detecting line commonly connects the first plurality of signal lines and a second detecting line commonly connects the second plurality of signal lines. Each of a first group of electrostatic discharge preventing circuits are connected with one of the signal lines of the first and second plurality of signal lines, and a common electrode line commonly connects the first electrostatic discharge preventing circuits. A resistance is connected in series to the common electrode line between the first and second plurality of signal lines.

In another aspect of the present invention, a liquid crystal display device structure for testing and detecting faults in the data signal lines of the liquid crystal device includes a plurality of data signal lines arranged on a liquid crystal panel, the data signal lines arranged such that odd-numbered data signal lines are alternately arranged with even-numbered data signal lines. An odd-numbered detecting line is commonly connected to odd-numbered data signal lines, and an even-numbered detecting line is commonly connected to even-numbered data signal lines. First electrostatic discharge preventing circuits are connected to the odd-numbered data signal lines, and a first common electrode line commonly connects the first electrostatic discharge preventing circuits. Second electrostatic discharge preventing circuits are connected to the even-numbered data signal lines, and a second common electrode line is commonly connected to the second electrostatic discharge preventing circuits. A resistance is connected in series between the first and second common electrode lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to an exemplary embodiment of the present invention, an example of which is illustrated in the accompanying drawings.

Figure 1:
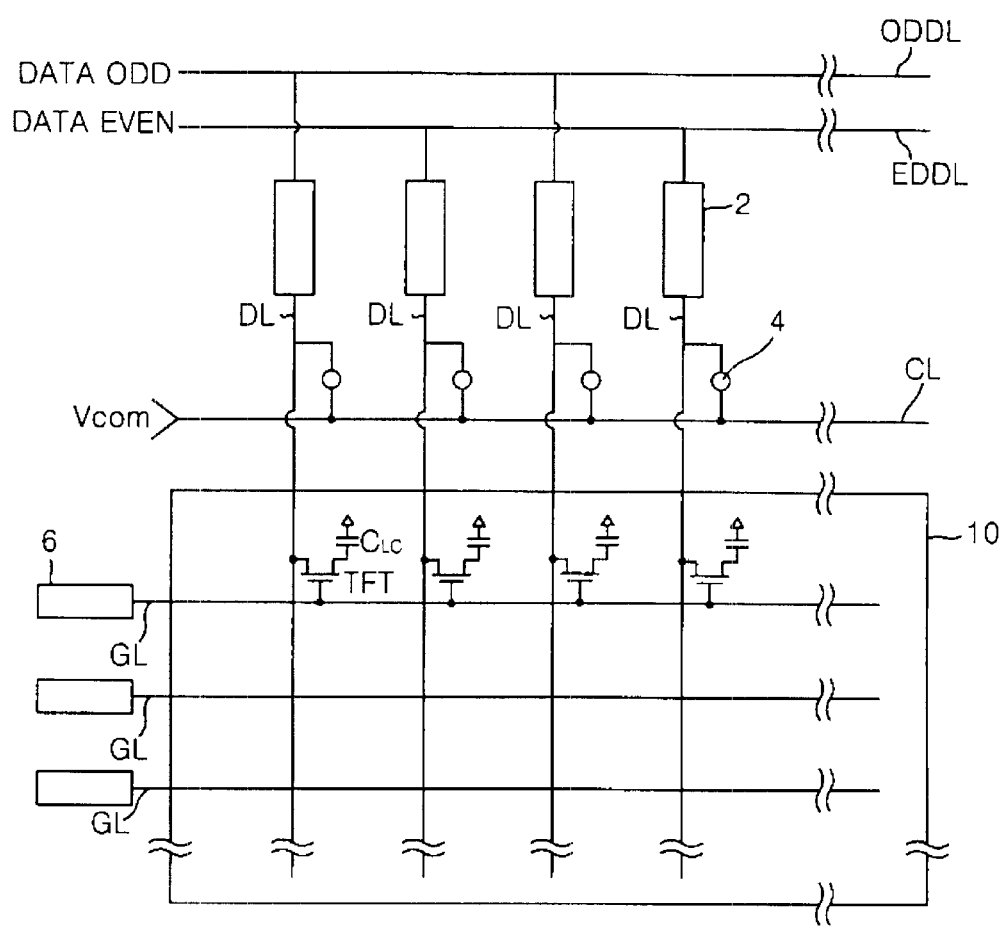
FIG. 1 provides a schematic block circuit diagram illustrative of a related art liquid crystal display device structure for testing a signal line.
Figure 2:
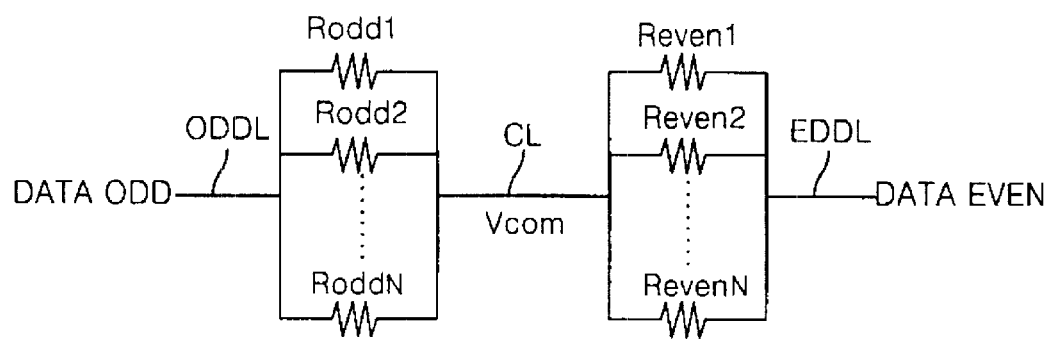
FIG. 2 is an equivalent circuit diagram of the data signal lines shown in FIG. 1.
Figure 3:
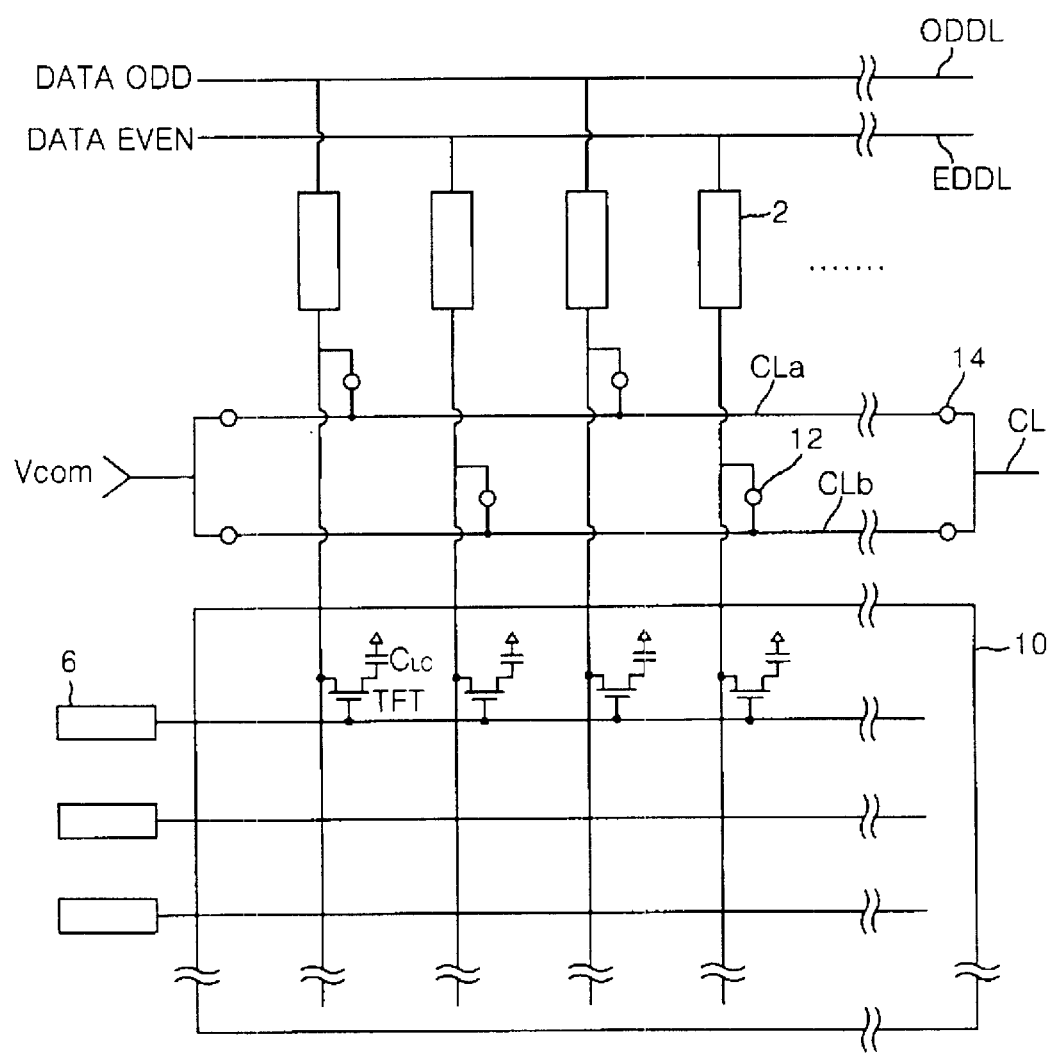
FIG. 3 provides a schematic block circuit diagram illustrative of a liquid crystal display device structure for testing a signal line according to an exemplary embodiment of the present invention.

FIG. 3 shows a liquid crystal display (LCD) device structure for testing a signal line according to an exemplary embodiment of the present invention. As shown in FIG. 3, the LCD device includes a picture display portion 10 having liquid crystal cells arranged in a matrix configuration, gate pads 6 connected to gate lines GL, and data pads 2 connected to data signal lines DL. An odd-numbered detecting line ODDL is commonly connected to odd-numbered ones of the data signal lines DL by way of the data pads 2. An even-numbered detecting line EDDL is commonly connected to even-numbered ones of the data signal lines DL also by way of the data pads 2. Two separated common electrode lines CLa and CLb are arranged on the LCD device to cross each of the data lines DL. An electrostatic discharge (ESD) preventing circuit 12 is connected between each of the odd-numbered data lines and the common electrode line CLa, and between each of the even-numbered data lines and the common electrode line CLb, in regions where the data lines DL cross the common electrode lines CLa and CLb. The LCD device of the present invention is further provided with at least two auxiliary ESD preventing circuits 14 connected in series between the two separated common electrode lines CLa and CLb.

The picture display portion 10 includes the gate lines GL, the data signal lines DL, thin film transistors (TFT's) formed at each intersection between the gate lines GL and the data signal lines DL, and liquid crystal capacitors Clc connected to the TFT's. The liquid crystal capacitor Clc equivalently represents a liquid crystal cell including a common electrode and an opposing pixel electrode. The opposing pixel electrode and common electrode sandwich a liquid crystal layer the display portion 10. The liquid crystal capacitor Clc charges a data voltage that is input from a data signal line DL to drive the liquid crystal, and thereby control a light transmissivity of the liquid crystal. It is to be understood that the liquid crystal capacitor Clc may additionally represent auxiliary capacitors (not shown) that are optionally provided at each pixel cell in the display portion 10 to assist in retaining a charged data voltage across the liquid crystal cell.

Each of the ESD preventing circuits 12 connected between the common electrode lines CLa and CLb and each data signal line DL are supplied with a common voltage Vcom, and the auxiliary ESD preventing circuits 14 connected between the two separated common electrode lines CLa and CLb may include a plurality of thin film transistors.

Each of the ESD preventing circuits 12 and 14 has a low impedance to discharge an over-current when a high voltage event caused by electrostatic discharge occurs on the data signal lines. On the other hand, each of the ESD preventing circuits 12 and 14 remains at high impedance under normal driving conditions, and therefore do not affect driving signals applied to the signal lines in the absence of electrostatic discharge or other high voltage events.

As shown in FIG. 3, the auxiliary ESD preventing circuits 14 of the present invention are connected in series between the two separated common electrode lines CLa and CLb and are designed such that their internal resistances Rd1 and Rd2 exceed the combined value of two equivalent line resistances connected in series between the common electrode line CL and the odd- and even-numbered detecting lines ODDL, EDDL.

After the thin film transistor array of the LCD is completed, a specific test signal pattern is applied to the odd-numbered detecting line ODDL and the even-numbered detecting line EDDL by way of a testing pad (not shown). Then, a resistance difference caused by a signal line fault is detected with the aid of the testing pad, to thereby test a signal line faults, such as shorts, breakage, or other related defects of the data signal lines DL.

Figure 4:
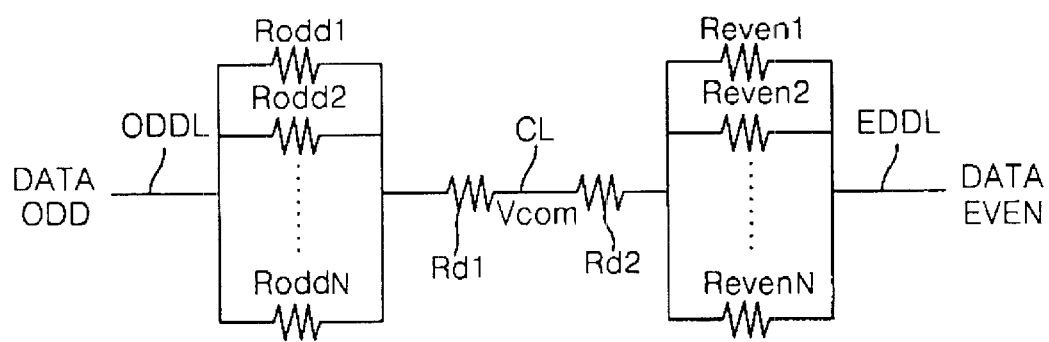
FIG. 4 is an equivalent circuit diagram of the data signal lines shown in FIG. 3.

FIG. 4 shows an equivalent circuit diagram of the exemplary testing arrangement illustrated in FIG. 3. In FIG. 4, the odd-numbered data signal lines DL are shown having equivalent line resistance components Rodd1 to RoddN connected in parallel between the odd-numbered detecting line ODDL and the common electrode line CL. Similarly, the even-numbered data signal lines DL are shown having equivalent line resistance components Reven1 to RevenN connected in parallel between the even-numbered detecting line EDDL and the common electrode line CL. Internal resistances Rd1 and Rd2 that exist in the internal circuit of the at least two auxiliary ESD preventing circuits 14 connected in series between the two separated common electrode lines CLa and CLb are connected in series to the common electrode line CL.

The resistances Rd1 and Rd2 of the auxiliary ESD preventing circuits 14 increase a detected critical resistance value between the odd-numbered detecting line ODDL and the even-numbered detecting line EDDL. As a result, the detected critical resistance value is much higher than a resistance value otherwise generated between the odd-numbered detecting line ODDL and the even-numbered detecting line EDDL when testing for shorts or other faults between the data signal lines DL at the interior of the display array.

As should be clear from the foregoing exemplary embodiment described above, the present invention provides two separated common electrode lines respectively connected to odd-numbered data signal lines and even-numbered data signal lines through ESD preventing circuits. Auxiliary ESD preventing circuits are serially connected between the common electrode lines so that a critical resistance is increased between a first detecting line commonly connecting the odd-numbered data signal lines and a second detecting line commonly connecting the even-numbered data lines. The increase in detected critical resistance results in an improved ability to detect faults in the LCD device data signal lines.

It will be apparent to those skilled in the art that various modifications and variations can be made in the LCD structure of the present invention without departing from the spirit or scope of the invention. Thus, it is intended that the present invention cover the modifications and variations of this invention provided they come within the scope of the appended claims and their equivalents.

What is claimed is:

1. A liquid crystal display device structure for testing and detecting signal line faults in the liquid crystal display device, comprising:

a first plurality of signal lines;

a second plurality of signal lines, the signal lines of the second plurality of signal lines being alternately arranged with signal lines of the first plurality of signal lines on a liquid crystal display panel;

a first detecting line commonly connecting the first plurality of signal lines;

a second detecting line commonly connecting the second plurality of signal lines;

electrostatic discharge preventing circuits, each of the first electrostatic discharge preventing circuits being connected with one of the signal lines of the first and second plurality of signal lines;

a common electrode line commonly connecting the first electrostatic discharge preventing circuits; and resistance means connected in series to the common electrode line between the first and second plurality of signal lines.

2. The liquid crystal display device structure according to claim 1, wherein the resistance means includes at least two serially connected auxiliary electrostatic discharge preventing circuits.

3. The liquid crystal display device structure according to claim 1, wherein a resistance value of the resistance means is substantially higher than a combined value of the equivalent line resistances connected in series between the first and second detecting lines.

4. A liquid crystal display device structure for testing and detecting faults in the data signal lines of the liquid crystal device, comprising:

a plurality of data signal lines arranged on a liquid crystal panel, the data signal lines arranged such that odd-numbered data signal lines are alternately arranged with even-numbered data signal lines;

an odd-numbered detecting line commonly connected to odd-numbered data signal lines;

an even-numbered detecting line commonly connected to even-numbered data signal lines;

first electrostatic discharge preventing circuits connected to the odd-numbered data signal lines;

a first common electrode line commonly connecting the first electrostatic discharge preventing circuits;

second electrostatic discharge preventing circuits connected to the even-numbered data signal lines;

a second common electrode line commonly connected to second electrostatic discharge preventing circuits; and resistance means connected in series between the first and second common electrode lines.

5. The liquid crystal display device according to claim 4, wherein the resistance means includes at least two serially connected auxiliary electrostatic discharge preventing circuits.

6. The liquid crystal display device structure according to claim 4, wherein a resistance value of the resistance means is substantially higher than a combined value of the equivalent line resistances connected in series between the first and second detecting lines.

* * * * *